(12) United States Patent
Genick, II

(10) Patent No.: US 6,478,519 B1
(45) Date of Patent: Nov. 12, 2002

(54) BOLT RETAINING ARTICLE

(75) Inventor: Raymond M. Genick, II, Waterford, MI (US)

(73) Assignee: Bamal Corporation, Birmingham, MI (US)

( * ) Notice: Subject to any disclaimer, the term of this patent is extended or adjusted under 35 U.S.C. 154(b) by 0 days.

(21) Appl. No.: 09/844,945

(22) Filed: Apr. 27, 2001

(51) Int. Cl.[7] .................................................. F16B 21/18
(52) U.S. Cl. ........................ 411/353; 411/508; 411/999
(58) Field of Search ................................. 411/352, 353, 411/512, 970, 999, 508, 509, 510

(56) References Cited

U.S. PATENT DOCUMENTS

| | | |
|---|---|---|
| 5,094,579 A | 3/1992 | Johnson |
| 5,395,194 A | 3/1995 | Johnson et al. |
| RE36,164 E | 3/1999 | Johnson et al. |
| 6,039,525 A | 3/2000 | Johnson |
| 6,059,503 A | 5/2000 | Johnson |
| 6,213,700 B1 * | 4/2001 | Everard ..................... 411/182 |

* cited by examiner

*Primary Examiner*—Flemming Saether
*Assistant Examiner*—Jori Schiffman
(74) *Attorney, Agent, or Firm*—Clark Hill PLC

(57) ABSTRACT

A bolt retaining article retains a bolt within a bore of a structure prior to the bolt being threadingly engaged within the bore. The bolt retaining article includes a tubular body having concave sections and convex sections. The concave and convex sections alternate around the tubular body. A number of engaging arms extend outwardly from the exterior surface of the concave sections to secure the bolt retaining article within the bore of the structure. The compressive forces created by the compression of the bolt retainer article when it is inserted into the bore prevent it from falling out. Likewise, the compression of the bolt retaining article around the bolt prevents the bolt from slipping out once inserted into the bolt retaining article. The bolt may slide within the bolt retaining article, but only with the application of an external axial force.

19 Claims, 2 Drawing Sheets

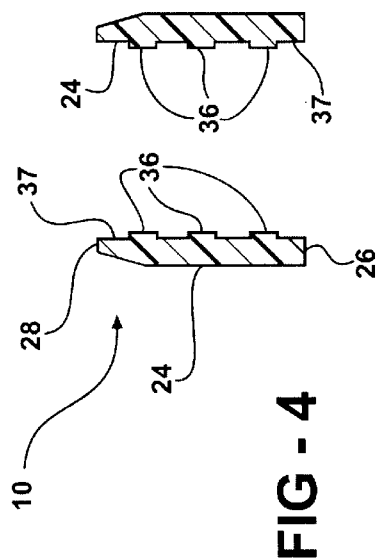
FIG - 4
FIG - 5
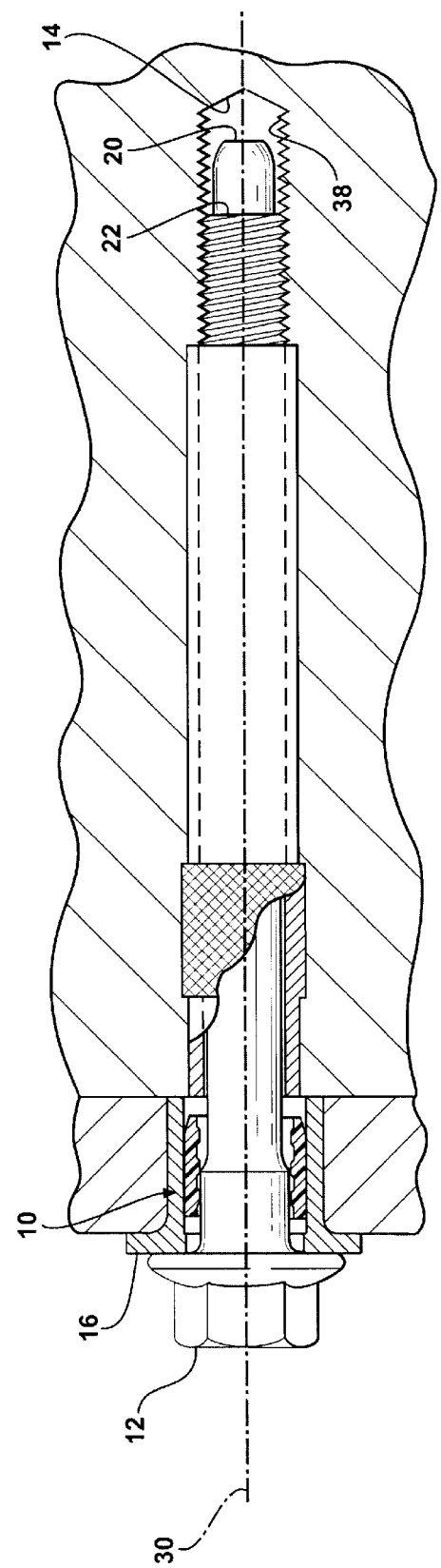
FIG - 6

BOLT RETAINING ARTICLE

BACKGROUND OF THE INVENTION

1. Field of the Invention

The invention relates to an article that retains cylindrical bodies to a structure. More specifically, the invention relates to an article for retaining bolts to a workpiece in a particular orientation until the bolt is needed to be secured to the workpiece.

2. Description of the Related Art

During assembly and manufacturing processes, bolts and other fasteners are often required to be positioned within the pieces they are to fasten or secure prior to the need to secure the pieces. If the bolts are not secured in place, it becomes difficult to change the pieces' orientation without having the bolts fall out of the bores in which they have been placed.

Another problem with bolts is they often have to be manually inserted into position due to the shape and size thereof. It is difficult to automate these procedures due to the difficulty of handling the bolts.

U.S. Pat. Re. No. 36,164 addresses this concern by disclosing a bolt retainer. The bolt retainer is designed to be slightly larger than the bore into which it is being inserted and to be slightly smaller inner diameter than the outer diameter of the bolt it is designed to hold. It does so by creating concave and convex sections that extend inwardly and outwardly, respectively, when taking the side view perspective. While this bolt retainer aids in the positioning of the bolt, it does not do so with enough force. Further, the bolt retainer lacks an outwardly extending piece that would aid in the handling of the bolt.

SUMMARY OF THE INVENTION

A bolt retaining article retains a bolt within a bore of a structure prior to the bolt being threadingly engaged within the bore. The bolt retaining article includes a tubular body that extends through a longitudinal axis and defining an inner diameter and an outer diameter. The tubular body includes a plurality of concave sections and a plurality of convex sections. Each of the plurality of concave sections are disposed adjacent each of the plurality of convex sections. An engaging arm extends outwardly from said tubular body to secure the bolt retaining article to the structure. The bolt retainer article is adapted to receive the bolt therethrough to prevent the bolt from falling out and away from the structure.

BRIEF DESCRIPTION OF THE DRAWINGS

Other advantages of the invention will be readily appreciated as the same becomes better understood by reference to the following detailed description when considered in connection with the accompanying drawings, wherein:

FIG. 4 is a cross-sectional view taken along lines 4—4 of FIG. 2;

FIG. 5 is a cross-sectional view taken along lines 5—5 of FIG. 2; and

FIG. 6 is a cross-sectional side view of one embodiment of the invention inserted into a bore of a structure.

DETAILED DESCRIPTION OF THE PREFERRED EMBODIMENT(S)

Figure 1:
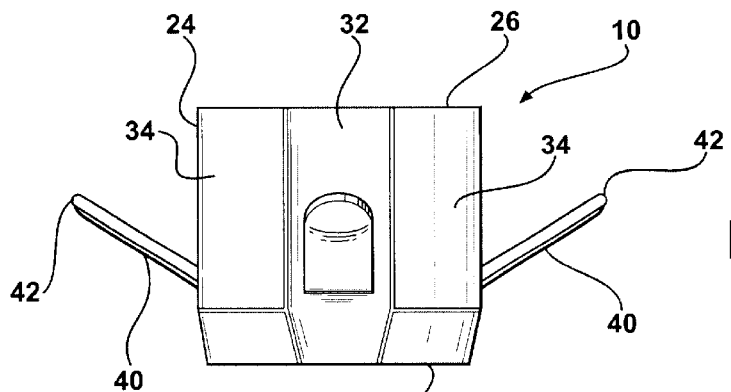
FIG. 1 is a side view of one embodiment of the invention.
Figure 2:
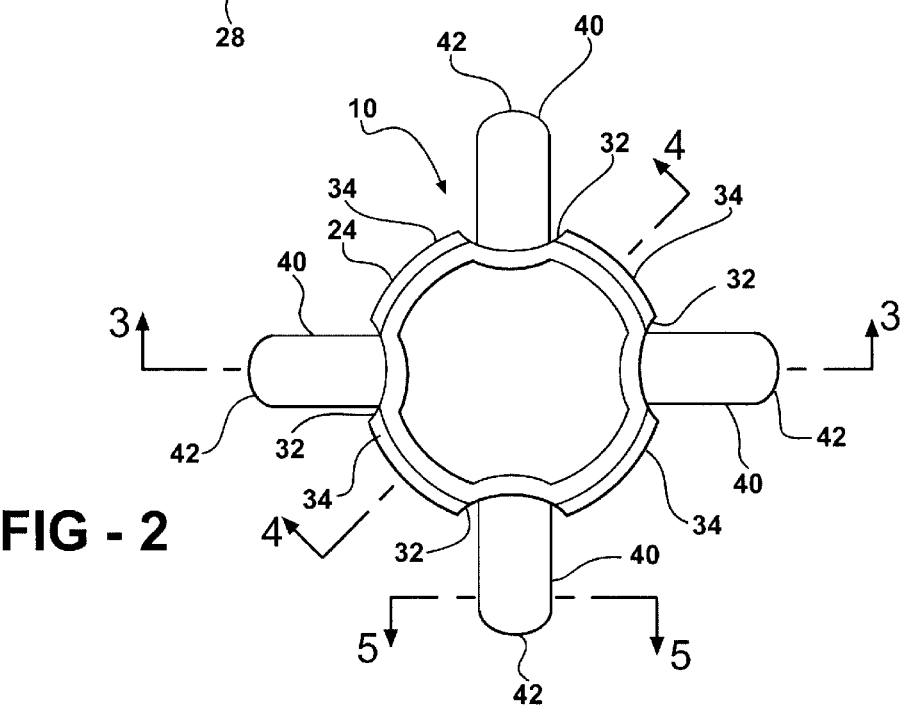
FIG. 2 is a top view of one embodiment of the invention.
Figure 3:
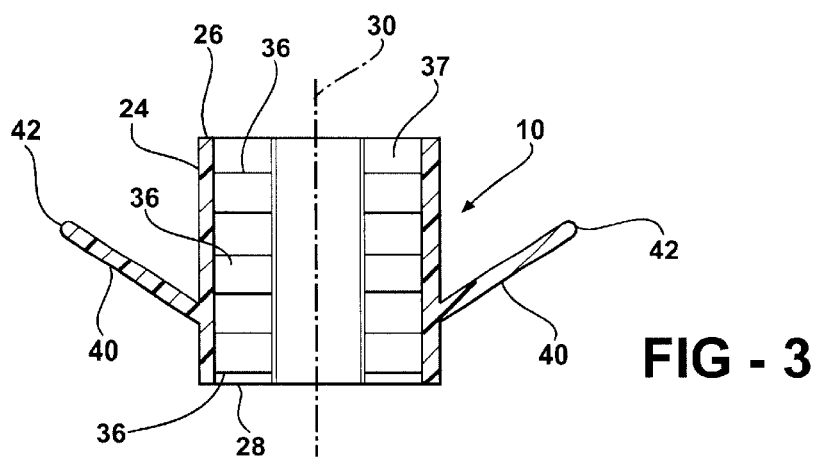
FIG. 3 is a side cross-sectional view of one embodiment of the invention taken along lines 3—3 of FIG. 2.

Referring to the Figures, a bolt retaining article is generally shown at 10. The bolt retaining article 10 is used to position a bolt 12 within a bore 14 or some type of threaded hole. As is shown in the Figures, the bolt retaining article 10 is received by a compression limiting device 16 which is, in turn, received by the bore 14. The compression limiting device 16 is disclosed in a copending, co-owned patent application (identified by Clark Hill, PLC attorney docket no. 19041-085656), which is hereby incorporated by reference.

The bolt 12 is shown as a standard bolt 12 having a tool engaging head 18 and a shaft 20. The shaft 20 may include a threaded portion 22. The threaded portion 22 defines a bolt outer diameter.

The bolt retaining article 12 includes a tubular body 24. The tubular body 24 extends between a first end 26 and a second end 28. The tubular body 24 is fabricated from a thermoplastic polyolefin alloy having a hardness of Shore D40, a tensile strength of approximately 1,000 psi at yield, and a flexural modulus (tangent) of approximately 25,000 psi.

The tubular body 24 defines a longitudinal axis 30. When the bolt 12 is inserted into the tubular body 24, the bolt 12 is coaxial with the tubular body 24 and also extends along the longitudinal axis 24.

The tubular body 24 includes a plurality of concave 32 and convex 34 sections. When viewing the tubular body 24 through a side view, as is shown in FIG. 1, the concave sections 32 extend inwardly into the tubular body 24 whereas the convex sections 34 extend outwardly. The concave sections 32 define an inner diameter of the tubular body 24. The inner diameter of the tubular body 24 is slightly less than the outer diameter of the shaft 20 of the bolt 12. This ensures that the bolt retaining article 10 will frictionally engage the bolt 12 and prevent it from slipping, out therefrom. The compression of the bolt retaining article 10 also provides forces directed outwardly against the sides of the bore 14 (or device 16 inserted therein) preventing the removal of the bore 14 therefrom.

Likewise, the convex sections 34 define the outer diameter of the tubular body 24. The outer diameter of the tubular body 24 is slightly greater than the bore 14. This ensures that the bolt retaining article 10 will frictionally engage the bore to prevent the bolt retaining article from slipping out therefrom. This will, in turn, prevent the bolt 12 from slipping out of the bore 14 prior to the bolt 12 threadingly engaging a threaded portion 38 of the bore 14.

In the embodiment shown, the concave sections 32 alternate with the convex sections 34. More specifically, each side of each concave section 32 adjoins a convex section 34. As such, each side of each convex section 34 adjoins a concave section 32. The interior of the tubular body 24 includes a number of ribs 36. The ribs 36 aid in the retention of the bolt 12 within the tubular body 24. The ribs 36 are raised from an inner surface 37 of the tubular body 24.

In the preferred embodiment, the concave 32 and convex 34 sections extend between the first 26 and second 28 ends of the tubular body 24. In alternative embodiments (not shown), the concave 32 and convex 34 sections extend through only a portion of the length of the tubular body 24.

The bolt retaining article 10 also includes an engaging arm 40 that extends out from the tubular body 24. In the preferred embodiment, a plurality of engaging arms 40 extend out therefrom. The engaging arms 40 are extensions of the tubular body 24 and extend out obliquely from the outer sides of the tubular body 24 to distal ends 42.

Each of the plurality of engaging arms 40 are bent when the bolt retaining article 10 is inserted into the bore 14. The resiliency of the engaging arms 40 add more compressive forces against the bore 14 to prevent the bolt retaining article 10 from falling out of the bore 14.

The engaging arms 40 act as a handle upon which an automated device, such as a robot, can hold and/or guide a bolt 12 to its proper position. The outward direction of the engaging arms 40 facilitates this task by allowing a device to grasp the engaging arms 40 without having to hold the bolt 12.

In addition, the distal ends 42 may provide a positive edge against which any lip or ledge in the bore 14 may prevent the bolt retaining article 10 from being removed.

The engaging arms 40 extend out of each of the concave sections 32. This allows the bolt retaining article 10 to incorporate the engaging arms 40 without adding to the outer diameter thereof because the convex sections 34 extend out further than the concave sections 32 at the point at which the engaging arms 40 are secured to the tubular body 24.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. A bolt retaining article for retaining a bolt within a bore of a structure prior to the bolt being threadingly engaged within the bore, said bolt retaining article comprising a tubular body extending through a longitudinal axis and defining an inner diameter and an outer diameter, said tubular body including a plurality of concave sections and a plurality of convex sections, each of said plurality of concave sections disposed adjacent each of said plurality of convex sections; and a plurality of engaging arms extending outwardly from a portion of said concave sections along an edge substantially perpendicular to said longitudinal axis to secure said bolt retaining article to the structure by increasing the surface area of said bolt retaining article that engages the bore, said bolt retaining article adapted to receive the bolt therethrough to prevent the bolt from falling out and away from the structure.

2. A bolt retaining article as set forth in claim 1 wherein said outer diameter is larger than the bore such that said bolt retaining article is securable to the structure upon its insertion inside the bore.

3. A bolt retaining article as set forth in claim 2 wherein said engaging arms extend out from said bolt retaining article obliquely thereto.

4. A bolt retaining article as set forth in claim 3 wherein each of said plurality of engaging arms extends out of each of said plurality of concave sections.

5. A bolt retaining article as set forth in claim 4 wherein each of said engaging arms extends out to a distal end.

6. A bolt retaining article as set forth in claim 5 wherein said distal end is curved.

7. A bolt retaining article as set forth in claim 6 wherein said tubular body extends between first and second ends.

8. A bolt retaining article as set forth in claim 7 wherein each of said plurality of concave sections extends between said first and second ends.

9. A bolt retaining article as set forth in claim 8 wherein each of said plurality of convex sections extends between said first and second ends.

10. A bolt retaining article as set forth in claim 9 wherein each of said plurality of concave sections extends from said first end to said second end.

11. A bolt retaining article as set forth in claim 10 wherein each of said plurality of convex sections extends from said first end to said second end.

12. A bolt retaining article for retaining a bolt within a bore of a structure prior to the bolt being threadingly engaged within the bore, said bolt retaining article comprising a tubular body extending through a longitudinal axis and defining an inner diameter and an outer diameter, said tubular body including a plurality of concave sections and a plurality of convex sections, each of said plurality of concave sections disposed adjacent each of said plurality of convex sections; and an engaging arm extending obliquely out from a portion of said concave sections along an edge substantially perpendicular to said longitudinal axis to secure said bolt retaining article to the structure by increasing the surface area of said bolt retaining article that engages the bore, said bolt retainer article adapted to receive the bolt therethrough to prevent the bolt from falling out and away from the structure.

13. A retaining assembly for securing a structure having a hole and a threaded bore coaxial therewith, said retaining assembly comprising:

a bolt having a head and a threaded shaft, said threaded shaft extendable through the hole and threadingly engagable with the threaded bore of the structure; a tubular body extending through a longitudinal axis coaxial with said bolt and the threaded bore, said tubular body defining an inner diameter and an outer diameter and including a plurality of concave sections and a plurality of convex sections, each of said plurality of concave sections disposed adjacent each of said plurality of convex sections, said tubular body adapted to receive said bolt therethrough to retain said bolt within the hole prior to said bolt threadingly engaging the threaded bore; and a plurality of engaging arms extending outwardly from a portion of said concave sections along an edge substantially perpendicular to said longitudinal axis to secure said tubular body to the structure by increasing the surface area of said bolt retaining article that engages the threaded bore until said bolt threadingly engages the threaded bore and preventing said bolt from falling away from the structure prior to said bolt threadingly engaging the threaded bore.

14. A retaining assembly as set forth in claim 13 wherein said outer diameter is larger than the hole of the structure such that said tubular body is securable to the structure upon insertion of said retaining assembly into the hole.

15. A retaining assembly as set forth in claim 14 wherein said engaging arms extend out from said tubular body obliquely thereto.

16. A retaining assembly as set forth in claim 15 wherein each of said plurality of engaging arms extends out of each of said plurality of concave sections.

17. A retaining assembly as set forth in claim 16 wherein each of said engaging arms extends out to a distal end.

18. A retaining assembly as set forth in claim 13 wherein said inner diameter of said tubular body is smaller than said threaded shaft of said bolt allowing for frictional engagement therebetween.

19. A retaining assembly as set forth in claim 18 wherein said outer diameter of said tubular body is larger than the hole in the structure allowing for frictional engagement between the hole in the structure and said retaining assembly.

* * * * *